(12) United States Patent
Acef

(10) Patent No.: US 10,732,484 B2
(45) Date of Patent: Aug. 4, 2020

(54) TERAHERTZ LASER SOURCE AND METHOD FOR EMITTING TERAHERTZ RADIATION

(71) Applicants: CENTRE NATIONAL DE LA RECHERCHE SCIENTIFIQUE, Paris (FR); SORBONNE UNIVERSITE, Paris (FR); OBSERVATOIRE DE PARIS, Paris (FR)

(72) Inventor: Mohand Ouali Acef, Paris (FR)

(73) Assignees: CENTRE NATIONAL DE LA RECHERCHE SCIENTIFIQUE, Paris (FR); SORBONNE UNIVERSITE, Paris (FR); OBSERVATOIRE DE PARIS, Paris (FR)

( * ) Notice: Subject to any disclaimer, the term of this patent is extended or adjusted under 35 U.S.C. 154(b) by 0 days.

(21) Appl. No.: 16/472,162

(22) PCT Filed: Dec. 22, 2017

(86) PCT No.: PCT/EP2017/084308
§ 371 (c)(1),
(2) Date: Jun. 20, 2019

(87) PCT Pub. No.: WO2018/115399
PCT Pub. Date: Jun. 28, 2018

(65) Prior Publication Data
US 2020/0096836 A1    Mar. 26, 2020

(30) Foreign Application Priority Data
Dec. 22, 2016 (FR) ..................... 16 63145

(51) Int. Cl.
*G02F 1/35*        (2006.01)
*H01S 3/00*        (2006.01)

(52) U.S. Cl.
CPC .......... *G02F 1/3534* (2013.01); *H01S 3/0092* (2013.01); *G02F 2203/13* (2013.01)

(58) Field of Classification Search
CPC ... G02F 1/3534; G02F 2203/13; H01S 3/0092
See application file for complete search history.

(56) References Cited

U.S. PATENT DOCUMENTS 7,391,795 B2 *   6/2008   Yumoto ................. G01N 21/39
                                                      372/21
8,774,243 B2 *   7/2014   Kim ...................... H01S 5/1096
                                                      372/43.01

(Continued)

FOREIGN PATENT DOCUMENTS

FR        3 004 820 A1       10/2014

OTHER PUBLICATIONS

Sasaki, et al., "Frequency Stabilized GaP Continuous-Wave Terahertz Signal Generator for High-Resolution Spectroscopy", Optics and Photonics Journal, vol. 4, No. 1, pp. 8-13, Jan. 1, 2014.

(Continued)

*Primary Examiner* — Daniel Petkovsek
(74) *Attorney, Agent, or Firm* — Baker & Hostetler LLP

(57) ABSTRACT

A THz laser source includes a first generator suitable for emitting at least one first light emission and one second light emission of frequencies that are multiples of a first reference frequency; a second generator suitable for emitting at least one first light emission and one second light emission of frequencies that are multiples of a second reference frequency different from the first reference frequency; the THz laser source furthermore comprises a nonlinear crystal suitable for forming, from the first light emissions emitted by each of the first and second generators, a THz light emission generated by difference-frequency generation, of frequency comprised between 0.3 THz and 10 THz; and at least one first frequency-stabilizing module allowing the frequency of (Continued)

one of the second emissions emitted by one of the first and second generators to be stabilized to an atomic transition.

14 Claims, 5 Drawing Sheets

(56) References Cited

U.S. PATENT DOCUMENTS 9,690,165 B2 * 6/2017 Acef .................... G02F 1/3532
2013/0161541 A1 6/2013 Kim et al.

OTHER PUBLICATIONS

Gliese, "THz Source Based on Laser Mixing", International Topical Meeting on Microwave Photonics, pp. 87-90, Sep. 3, 1997.
Tani, et al., "Generation of terahertz radiation by photomixing with dual- and multiple-mode lasers", Semiconductor Science and Technology, vol. 20, No. 7, Jul. 1, 2005.
Lee, et al., "Saturated Neon absorption inside a 6328 A laser", Appl. Phys. Lett., vol. 10, No. 11, Jun. 1, 1967.

* cited by examiner

10,732,484 B2

TERAHERTZ LASER SOURCE AND METHOD FOR EMITTING TERAHERTZ RADIATION

CROSS-REFERENCE TO RELATED APPLICATIONS

This application is a National Stage of International patent application PCT/EP2017/084308, filed on Dec. 22, 2017, which claims priority to foreign French patent application No. FR 1663145, filed on Dec. 22, 2016, the disclosures of which are incorporated by reference in their entirety.

FIELD OF THE INVENTION

The present description relates to a terahertz (THz) laser source and to a method for emitting terahertz emissions.

BACKGROUND

Terahertz emissions (THz) are generally defined in the frequency band located between 0.3 THz and 10 THz. Their generation and their detection are of great interest given the many applications that they enable such as for example the detection of pollutants and dangerous materials, surveillance imaging, medical imaging, THz communications, etc.

The emission of THz emissions may be obtained directly using emission sources, for example backward wave oscillators (BWOs), which are also known as "Carcinotrons™", molecular lasers or certain solid-state lasers such as quantum-cascade lasers.

It is also possible to obtain THz emissions indirectly using nonlinear conversion in nonlinear crystals of emissions of more accessible frequencies such as radiofrequencies, microwave frequencies, visible or infrared frequencies. The processes implemented are for example frequency multiplication, optical rectification or even heterodyne mixing.

The article "*Frequency Stabilized GaP Continuous-Wave Terahertz Signal Generator for High-Resolution Spectroscopy*" by Sasaki et al (Optics and Photonics Journal, 2014, 4, 8-13) thus presents an indirect THz source based on use of two tunable laser sources in the near infrared. The beams output from the two laser sources are spatially superposed using a plate beamsplitter and illuminate a nonlinear crystal of gallium phosphide (GaP) in order to generate a THz emission the frequency of which corresponds to the frequency difference between the frequencies of the two incident laser beams. The resultant THz frequency may be tuned by changing the frequency of one of the two tunable laser sources. This technique allows a tunable THz emission to be produced at room temperature.

The present description also presents an indirect THz laser source that, as in the aforementioned article, is based on difference-frequency generation and that, with respect to known devices, has an excellent frequency stability and a THz emission of extremely precise frequency.

SUMMARY

According to a first aspect, the present description relates to a THz laser source comprising:

a first generator suitable for emitting at least one first light emission of frequency $w_1=nw_a$ and one second light emission of frequency $w_2=mw_a$, where n and m are integers higher than or equal to 1 and where $w_a$ is a first reference frequency;

a second generator suitable for emitting at least one first light emission of frequency $w_3=lw_b$ and one second light emission of frequency $w_4=pw_b$, where l and p are integers higher than or equal to 1 and where $w_b$ is a second reference frequency different from the first reference frequency $w_a$;

a nonlinear crystal suitable for forming, from said first light emissions emitted by each of the first and second generators, a THz light emission generated by difference-frequency generation, of frequency equal to $w_5=nw_a-lw_b$ and comprised between 0.3 THz and 10 THz; and at least one first frequency-stabilizing module allowing the frequency of one of said second emissions emitted by one of the first and second generators to be stabilized to an atomic transition.

The frequency of the THz laser source thus described is therefore stabilized to an atomic transition, this allowing not only an excellent frequency stability to be obtained but also a THz emission of very precise frequency. Such a THz laser source also has the advantage of being compact and compatible with use outside the laboratory.

According to one or more example embodiments, the first and second emissions emitted by a generator may be emissions of the same frequency (e.g. n=m and/or l=p); for example, it may be a question of light emissions obtained from the same emission split into two emissions by means of a splitting element. Alternatively, and in particular to allow more latitude as to the choice of the frequencies of the emissions used for the stabilization on the one hand and for the generation of the THz emission by difference-frequency generation on the other hand, the first and second light emissions may be obtained by sum-frequency generation, frequency multiplication, or difference-frequency generation. In this case, the frequencies of the first and second light emissions emitted by a generator are multiples of each other but not equal. In any case, all the light emissions emitted by a generator may be coherent with one another, i.e. have a fixed phase relationship, such that the frequency stabilization of one light emission emitted by a generator leads to the frequency stabilization of the other light emissions emitted by this generator.

According to one or more example embodiments, the atomic transition is an atomic transition of iodine, which has the advantage of having frequency transitions that are perfectly calibrated, and of a very high quality factor in the visible range of the electromagnetic spectrum (500 nm-700 nm). Other atomic transitions may be used, for example those of the acetylene ($C_2H_2$), water vapor ($H_2O$), oxygen ($O_2$), carbon monoxide (CO), methane ($CH_4$), in the infrared, or alkaline atoms in the visible or near infrared (for example cesium (Cs), rubidium (Rb), potassium (K), etc.).

According to one or more example embodiments, the frequencies of said second emissions emitted by each of the first and second generators are stabilized, independently of each other, to an atomic transition. The THz laser source then comprises first and second frequency-stabilizing modules each allowing the frequency of the second light emission emitted by each of the first and second generators, respectively, to be stabilized to an atomic transition. The frequency stabilization of the two light emissions emitted by each of the generators, independently, stabilizes the frequency of the THz emissions generated by difference-frequency generation.

According to one or more example embodiments, the frequency of at least one of the first and second generators is tunable in a frequency range broader than the line width of the optical transition, allowing a tunable THz source to be formed. Specifically, if the atoms used for the stabilization have a series of identified separate atomic transitions, it is possible to change the atomic transition to which one and/or the other of the generators is stabilized and, therefore, modify the THz frequency.

According to one or more example embodiments, the first generator is suitable for emitting at least one third light emission of frequency $w_6 = qw_a$, where q is an integer higher than or equal to 1 and the second generator is suitable for emitting at least one third light emission of frequency $w_7 = rw_b$, where r is an integer higher than or equal to 1, with $q\,w_a - r\,w_b$ a multiple or submultiple of $n\,w_a - lw_b$. It is thus possible by virtue of a measurement of $q\,w_a - rw_b$, for example in the radiofrequency or microwave domain, to know, perfectly, the THz frequency ($n\,w_a - lw_b$).

According to one or more example embodiments, the laser source furthermore comprises a frequency comparator, also called a frequency mixer, suitable for receiving, on the one hand, the third emissions respectively emitted by each of the first and second generators and, on the other hand, a reference signal of given frequency, in order to deliver a resultant signal, for example a radiofrequency signal, the measurement of the frequency of which allows the frequency difference between said third emissions to be determined. The frequency comparator may be a photo-mixer, for example of Schottky type. The frequency of the reference emission is for example a radiofrequency or microwave frequency. It is thus possible to know with exactness the frequency difference between the third emissions emitted by each of the first and second generators and thus to increase the precision with which the generated THz frequency is known.

According to one or more example embodiments, the THz laser source comprises a first frequency-stabilizing module allowing the frequency of said second emission emitted by a first of said generators to be stabilized to an atomic transition; and a module for servocontrolling the second generator to the first generator. In this embodiment, the first light emission emitted by the second generator is indirectly stabilized to an atomic transition; this allows the stability of the generated THz emission to be preserved and allows continuous tunability of the THz generation to be introduced.

According to one or more example embodiments, the first generator is suitable for emitting at least one third light emission of frequency $w_6 = qw_a$, where q is an integer higher than or equal to 1; the servocontrolling module comprises a first frequency comparator suitable for receiving, on the one hand, the third emission emitted by the first generator and the second emission emitted by the second generator and, on the other hand, a first reference signal of given frequency, in order to deliver a first radiofrequency signal; the servocontrolling module furthermore comprises a second frequency comparator suitable for receiving said first radiofrequency signal and a radiofrequency second reference signal of given frequency, in order to deliver a control signal characteristic of the frequency difference between the frequencies of the first radiofrequency signal and of the radiofrequency second reference signal; and a module for controlling the second generator depending on said control signal.

According to one or more example embodiments, at least one of the first and second generators is a generator of "trident" type suitable for generating at least three light emissions of different frequencies in the visible and/or infrared, the at least three light emissions having a fixed phase relationship with one another. Such a generator, which allows three emissions of different frequencies to be emitted in phase is, for example, a generator of visible and infrared coherent laser beams such as that described in patent FR3004820.

According to a second aspect, the present description relates to a method for emitting a THz laser emission comprising the following steps:

generating with a first generator a first light emission of frequency $w_1 = nw_a$ and a second light emission of frequency $w_2 = mw_a$, where n and m are integers higher than or equal to 1 and where $w_a$ is a first reference frequency;

generating with a second generator a first light emission of frequency $W_3 = lw_b$ and a second light emission of frequency $w_4 = pw_b$, where p is an integer higher than or equal to 1 and where $w_b$ is a second reference frequency different from $w_a$;

forming from said first emissions emitted by the first and second generators a THz light emission generated by difference-frequency generation, of frequency equal to $w_5 = nw_a - lw_b$ and comprised between 0.3 THz and 10 THz; stabilizing the frequency of at least one of the second light emissions emitted by the first and second generators.

According to one or more example embodiments of the second embodiment, the method for emitting a THz laser emission furthermore comprises the following steps:

generating with the first generator at least one third light emission of frequency $w_6 = q\,w_a$, where q is an integer higher than or equal to 1;

generating with the second generator at least one third light emission of frequency $w_7 = r\,w_b$, where r is an integer higher than or equal to 1, with $q\,w_a - rw_b$ a multiple or submultiple of $n\,w_a - lw_b$;

measuring $qw_a - rw_b$ in order to deduce therefrom the frequency of the THz emission generated.

According to one or more example embodiments of the second embodiment, the method for emitting a THz laser emission furthermore comprises the following steps:

varying at least one of the first and second reference frequencies ($w_a$ and/or $w_b$);

stabilizing at least one of the first light emissions emitted by the first and second generators to at least one second atomic transition.

Thus, by changing the line of the atom to which the second and/or fourth emissions are stabilized, the THz frequency is varied. This allows a discrete and dense spectrum of THz emissions that are ultrastable in frequency to be generated.

According to one or more example embodiments of the second embodiment, the method for emitting a THz laser emission comprises the following steps:

stabilizing the frequency of said second emission emitted by a first of said generators to an atomic transition; and servocontrolling the second generator to the first generator.

BRIEF DESCRIPTION OF THE DRAWINGS

Other advantages and features of the subject matter of the description will become apparent on reading the description, which is illustrated by the following figures.

DETAILED DESCRIPTION

In the figures, identical elements have been referenced with the same references.

Figure 1:
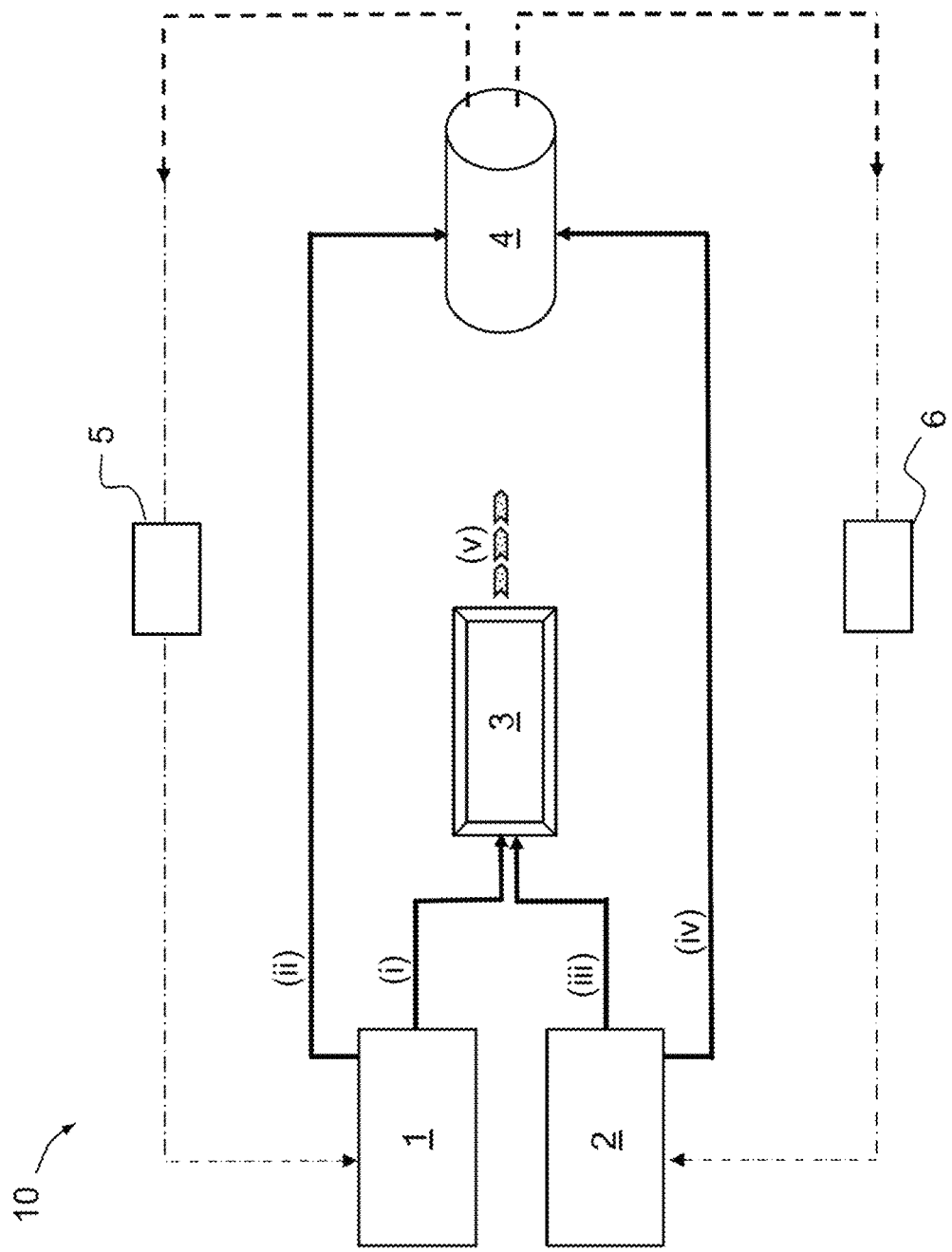
FIG. 1, a schematic illustrating a THz laser source according to a first example of the present description in which each generator emits a light emission the frequency of which is stabilized to an atomic transition independently.

FIG. 1 illustrates a first example of a THz laser source 10 according to the present description. It comprises a first generator 1, a second generator 2, a nonlinear crystal 3 suitable for difference-frequency generation, a cell 4 containing an atomic vapor and modules for stabilizing the frequency of the light emissions emitted by the generators 1, 2 to separate atomic transitions of atoms of the cell 4. The stabilizing modules are schematically shown in the figure by the modules 5, 6 and will be described in more detail below.

More precisely, in the example shown in FIG. 1, the first generator 1 is suitable for emitting at least one first and one second light emission (referenced (i) and (ii)) the frequencies of which are multiples of a first reference frequency denoted $w_a$. It is thus possible to define the frequencies $w_1$ and $w_2$ of the first and second light emissions emitted by the first generator by $w_1=nw_a$ and $w_2=mw_a$, respectively, where n and m are integers higher than or equal to 1. In the same way, the second generator 2 is suitable for emitting at least one first and one second light emission (referenced (iii) and (iv) in FIG. 1) the frequencies of which are multiples of a second reference frequency denoted $w_b$, and different from the first reference frequency $w_a$. It is thus possible to define the frequencies $w_3$ and $w_4$ of the first and second light emissions emitted by the second generator by $w_3=lw_b$ and $w_4=pw_b$, respectively, where l and p are integers higher than or equal to 1.

According to the present description, the nonlinear crystal 3 is suitable for forming, from said first light emissions emitted by each of the first and second generators, a THz light emission (v) generated by difference-frequency generation, of frequency comprised between 0.3 THz and 10 THz. The frequency $w_5$ of the generated THz light emission (v) is therefore defined by $w_5=nw_a-lw_b$. The first emissions (i) and (iii) emitted by the first and second generators 1, 2 are for example injected with a lens into the nonlinear crystal 3 or via a suitable collimator in the case of a fiber-based optical device in which the emissions (i) and (ii) are conveyed by optical fibers.

In the example of FIG. 1, the THz laser source comprises a first frequency-stabilizing module, referenced 5, for stabilizing the frequency of the second emission (ii) emitted by the first generator 1 to an atomic transition, and a second frequency-stabilizing module 6 for stabilizing the frequency of the second light emission (iv) emitted by the second generator 2 to an atomic transition. In the example of FIG. 1, the frequency stabilizations for the first and second generators are to separate atomic transitions of identical atoms but could also be to atomic transitions of different atomic species.

Thus, two light emissions each coming from the first and second generator allow a THz emission to be generated by difference-frequency generation in a nonlinear crystal and two other light emissions each coming from the first and second generator allow the frequency of the light emissions intended to generate the THz emission to be stabilized, this allowing not only the frequency of the generated THz emission to be stabilized to a very high precision but also the generated THz frequency to be perfectly known because the atomic transitions are very well known.

The atoms used for the frequency stabilization are for example iodide atoms or alkaline atoms in the visible or near infrared (for example cesium Cs, rubidium Rb, potassium K). The stabilization may also be, in the infrared, to atomic transitions of molecules such as acetylene ($C_2H_2$), water vapor ($H_2O$), oxygen ($O_2$), carbon monoxide (CO), and methane ($CH_4$).

The atomic transitions of molecular iodine are in particular transitions that are perfectly calibrated and that allow the frequency of the emission that it is sought to stabilize to be very precisely known. In addition, since iodine absorbs between 500 nm and 700 nm, its use allows a frequency-tripled Er-doped source, a frequency-doubled YAG source or a frequency-doubled Yb-doped source to be worked with, these sources being powerful and compact, as will be described in more detail below.

Figure 4:
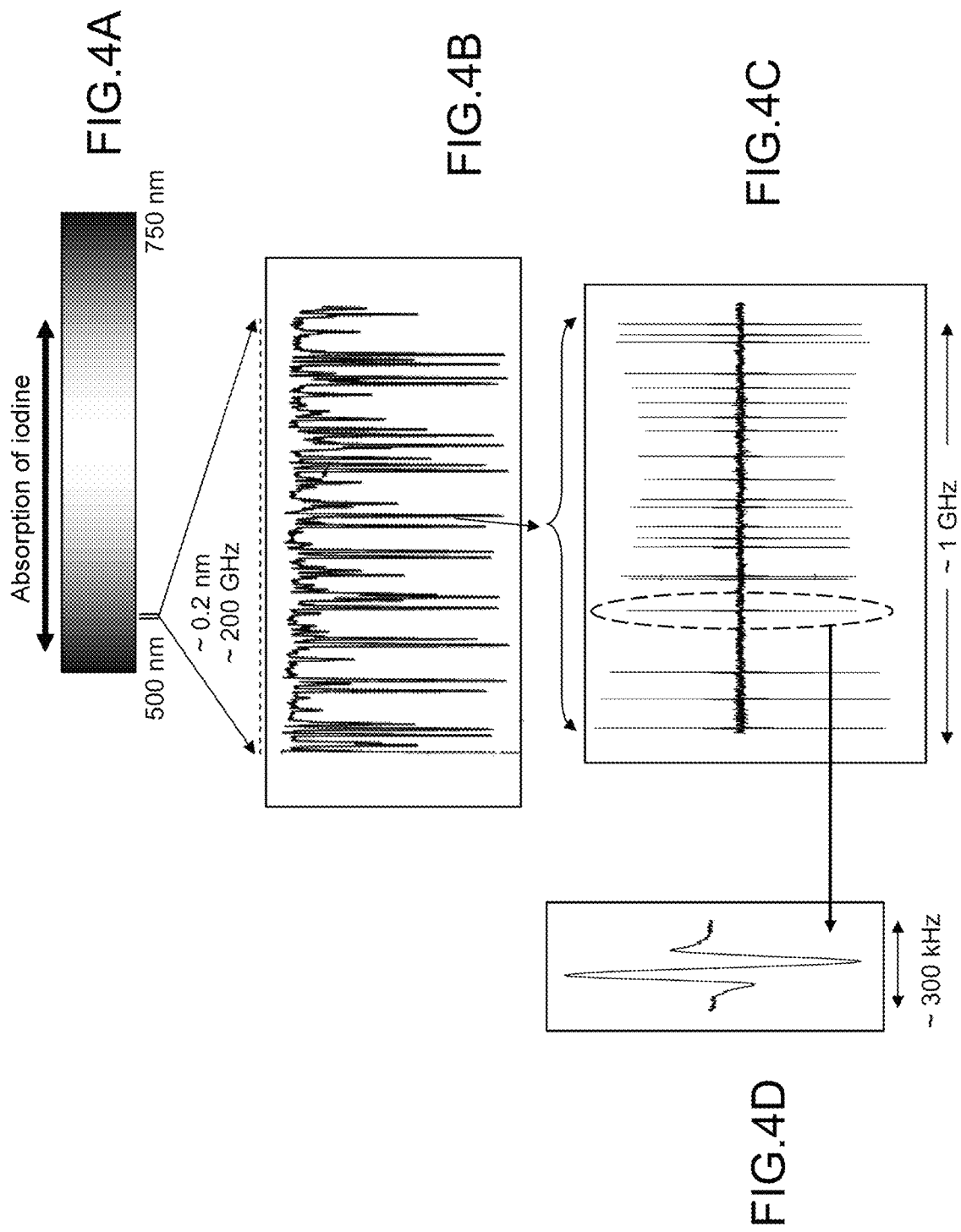
FIGS. 4A-4D, extracts of the absorption spectrum of iodine, shown with various precisions.

FIGS. 4A to 4D show, by way of illustration, the absorption lines of iodine between 500 and 700 nm (FIG. 4A), in a narrower spectral band of about 0.2 nm (200 GHz) at about 514.5 nm (FIG. 4B), at about 514.5 nm in a band of about 1 GHz (FIG. 4C) and at 514.581 nm in a band of about 300 kHz (FIG. 4D). The narrowness of the hyperfine lines of iodine increases as the dissociation limit of the molecule, which is about 500 nm, is approached; however, about this value, the intensities of the lines are lower. The best compromise between the quality factor of the lines and the nature and intrinsic quality of the available laser sources is therefore sought. FIG. 4B thus illustrates a portion of the absorption spectrum of molecular iodine in the green that allows a good compromise between the quality factor of the lines of molecular iodine ($Q\sim2\times10^9$ at 515 nm) and the nature and intrinsic quality of the available laser sources to be achieved. Each line shown in FIG. 4B is composed of a hyperfine cluster that extends over about 1 GHz, and an example of which is shown in FIG. 4C. FIG. 4D shows the narrow transition of iodine at 514.581 nm. Thus, molecular iodine has more than 10 000 identified saturated absorption lines in the 510 nm-521 nm range, forming a broad comb of ultrastable frequencies capable of being used to indirectly stabilize the frequency of the THz laser source by virtue of the method for generating THz emission according to the present description.

The first and second stabilizing modules 5, 6 schematically shown in FIG. 1 each comprise a module for interrogating the atomic transition and a frequency-servocontrolling device in order to control the frequency of the generator. The interrogating module for example makes use of the technique known as "saturated absorption" and for example described in the article by P. H. Lee et al. ("Saturated Neon absorption inside a 6328 A laser", Appl. Phys. Lett., Vol. 10, No. 11, Jun. 1, 1967). This technique consists in interrogating the vapor of atoms that is contained in the cell 4 with two counter-propagating beams with a view to fabricating a frequency discriminant of high metrological quality. An error signal of odd symmetry of small width is thus generated. The error signal is sent to a frequency-servocontrolling device suitable for acting on an element specific to the laser, and the function of which is to set the emitted frequency (e.g. piezoelectric ceramic, diode current, temperature, etc.).

It is thus possible to act on an external element (for example variation of cavity length) or internal element (for example variation of the temperature of the generator, variation of the injection current in the case of a diode, etc.) of the generator. Thus, the servocontrolling module allows the frequency of the signal generated by the electrical beat to be kept constant in order to stabilize the generator.

It may be advantageous for each of the generators 1, 2 to emit first and second light emissions of frequencies that are different from each other in order to allow the frequency of the emission used for the stabilization and the frequency of the emission used for the generation of the THz emission to be chosen independently. Thus, as explained above, a stabilization to molecular iodine is advantageously carried out in the green with frequencies comprised between about 400 THz and about 600 THz. For the generation of the THz emission, the difference-frequency generation may be carried out using emissions in the infrared or in the visible, for example. Difference-frequency generation carried out using emissions in the visible (~700-800 nm) is preferred because nonlinear crystals—for example based on GaAs—are more sensitive in this wavelength range, this therefore allowing more effective generation of THz emissions.

In any case, it is sought to ensure that the emission mechanisms of the first and second light emissions allow coherent in-phase emissions to be emitted, i.e. emissions having a fixed phase relationship, in order to ensure that the frequency stabilization of said second emissions results in a frequency stabilization of said first emissions for the generation of the THz emission. These emission mechanisms are for example frequency multiplication, sum-frequency generation, or difference-frequency generation.

Thus, each generator may comprise, in one example embodiment, a laser emission source having a wavelength-tunable reference frequency (for example an erbium-doped fiber laser or a laser diode) and one or more nonlinear crystals suitable for generating harmonics of the reference frequency. Erbium-doped fiber lasers generally have a greater tunability (wavelength tunability of about 1000 pm) than laser diodes (about 50 pm). Laser diodes have the advantage of compactness and are able to be servocontrolled via the injection current. The nonlinear crystal is for example a crystal made of lithium niobate ($LiNbO_3$). Other crystals may be used as known per se, such as for example crystals of periodically polarized potassium titanyl phosphate (or PPKTP).

In the case where it is possible to work with first and second emissions of same frequency, the generator may comprise a wavelength-tunable laser emission source, for example an erbium-doped fiber laser or a laser diode, and a splitting element in order to form the two light emissions.

Figure 2:
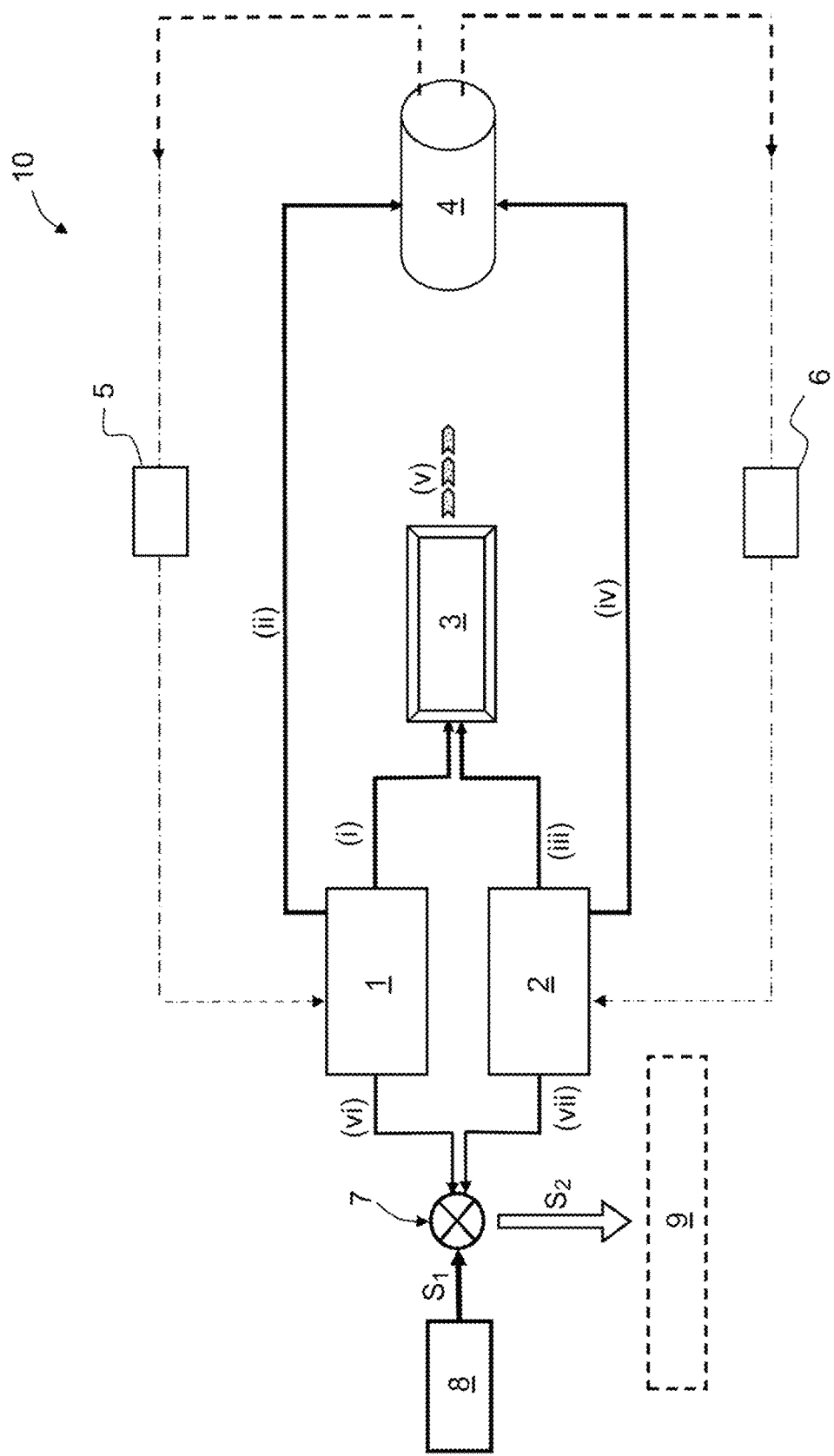
FIG. 2, a schematic illustrating a THz laser source of the type of that illustrated in FIG. 1 with in addition means for measuring the frequency of the generated THz emission.

FIG. 2 illustrates one example embodiment of a THz laser source according to the present description in which each of the generators emits, in addition to the first and second light emissions, a third light emission. In this example, as in the example of FIG. 1, the frequency of each of the generators is stabilized to a separate atomic transition.

Thus, the first generator 1 is suitable for emitting at least one third light emission (vi) of frequency $w_6=qw_a$, where q is an integer higher than or equal to 1, and the second generator 2 is suitable for emitting at least one third light emission (vii) of frequency $w_7=rw_b$, where r is an integer higher than or equal to 1. As above, the frequencies of the emissions emitted by a generator may be identical, in which case these emissions are obtained by means of one or more splitting elements. Alternatively, the frequencies of the light emissions emitted by a generator may be multiples of the reference frequency but not equal. In this case, it is ensured that the mechanism of generation of the light emissions allows coherent in-phase light emissions to be obtained.

In one example embodiment, each generator emits a third light emission and these light emissions are used, as illustrated in FIG. 2, to measure the generated THz frequency. To do this, it is ensured that $qw_a-rw_b$ is a multiple or a submultiple of $nw_a-lw_b$. Thus, knowledge of $qw_a-rw_b$ will allow the value of the frequency of the THz emission (v) to be obtained.

According to one example embodiment, the measurement of the frequency difference $qw_a-rw_b$ is obtained by means of a frequency comparator 7, for example a photo-mixer of Schottky type, suitable for receiving the third emissions (vi) and (vii) emitted by each of the first and second generators. The mixer 7 also receives a reference signal $S_1$ emitted by a source 8, of given frequency $f_0$, for example a microwave frequency. This results in a signal $S_2$, for example a radiofrequency signal, the frequency of which is equal to the frequency difference $\Delta_1=[qw_a-rw_b]-k\times f_0$, where k is an integer number, and $f_0$ is the reference frequency. A frequency reader 9 for example allows the frequency of the resulting signal $S_2$ to be determined.

Measurement of the generated frequency difference is particularly useful in the case where it is sought to form a tunable THz laser source the frequency of which is known with exactness. Specifically, it is possible to choose for one and/or the other of the generators 1, 2, an emission source the frequency of which is tunable in a frequency range broader than the line width of the optical transition. In this case, it will be possible to stabilize the frequency of the light emission used for the generation of the THz emission to one of the atomic lines, for example one of the multiple lines of molecular iodine. Measurement of the frequency difference $qw_a-rw_b$ will then allow the frequency of the THz generation to be precisely known. The THz source thus formed is tunable and able to generate a discrete and dense spectrum of THz emissions that are ultrastable in frequency.

Figure 3:
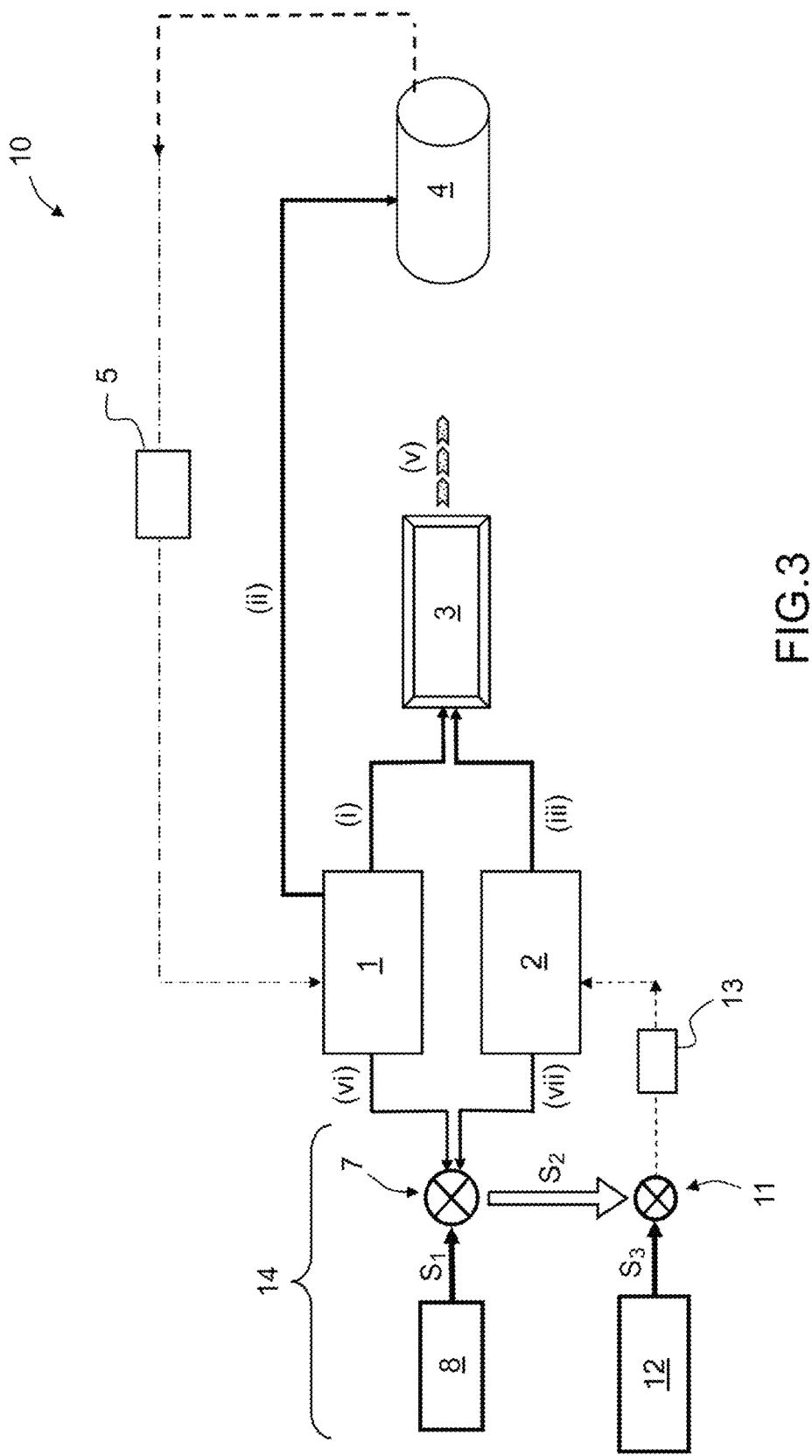
FIG. 3, a schematic illustrating a THz laser source according to a second example of the present description, in which the frequency of a light emission emitted by a first generator is stabilized to an atomic transition and the frequency of a light emission emitted by the second generator is stabilized to a light emission emitted by the first generator.

FIG. 3 illustrates another example of a THz laser source according to the present invention.

In this example, the frequency of only one of the two generators is stabilized directly to an atomic transition. In the example of FIG. 3, it is for example the generator referenced 1 (but it could equally well be the other generator, referenced 2). Thus, as above, the THz source comprises a first frequency-stabilizing module 5 allowing the frequency of the second emission (ii) emitted by the first generator to be stabilized to an atomic transition of atoms contained in the cell 4. The second generator is for its part servocontrolled to the first generator by means of a servocontrolling module 14, an example embodiment of which is described below.

As is illustrated in FIG. 3, the first generator is suitable, in this example, for emitting at least one third light emission (vi) of frequency $w_6=qw_a$, where q is an integer higher than or equal to 1. As above, the light emissions emitted by the first generator are either of identical frequency, or coherent in phase.

The servocontrolling module 14 comprises, in this example, a first frequency comparator 7 suitable for receiving, on the one hand, the third emission (vi) emitted by the first generator and the second emission (vii) emitted by the second generator, and, on the other hand, a first reference signal ($S_1$), emitted by a source 8, of given frequency $f_0$, for example of radiofrequency or microwave frequency, in order to deliver a signal $S_2$, for example a radiofrequency signal. The servocontrolling module moreover comprises a second frequency comparator 11 suitable for receiving said first radiofrequency signal $S_2$ and a radiofrequency second reference signal $S_3$, emitted by a source 12, of given frequency $f_1$, in order to deliver a control signal (typically a control voltage) characteristic of the frequency difference between the frequencies of the first radiofrequency signal $S_2$ and the radiofrequency second reference signal $S_3$; more precisely, the frequency of the control signal may be written $\Delta_2=([qw_a-rw_b]-k\times f_0)-f_1$, where k is a nonzero integer. The servocontrolling module also comprises a module 13 for controlling the second generator, for example a voltage comparator, allowing the emission frequency of the second generator to be controlled depending on said control signal.

Thus, in this example, frequency stabilization of the THz source is also obtained ultrastably by stabilization to an atomic transition, but indirectly for one of the generators.

This example in particular allows a continuously tunable THz emission to be formed. Specifically, when the frequency $f_1$ of the radiofrequency second reference signal $S_3$ varies and when the servocontrolling module operates in closed-loop ($\Delta_2=0$), the frequency $rw_b$ will vary in the same proportions as the frequency $f_1$ of the second reference signal in order to maintain the condition $\Delta_2=0$. Therefore, the THz frequency will be continuously and controllably variable. Moreover, the THz frequency will be known and will possess the same stability as that of the emissions from which it is composed because in closed regime $w_7=qw_a-k\times f_0-f_1$.

Figure 5:
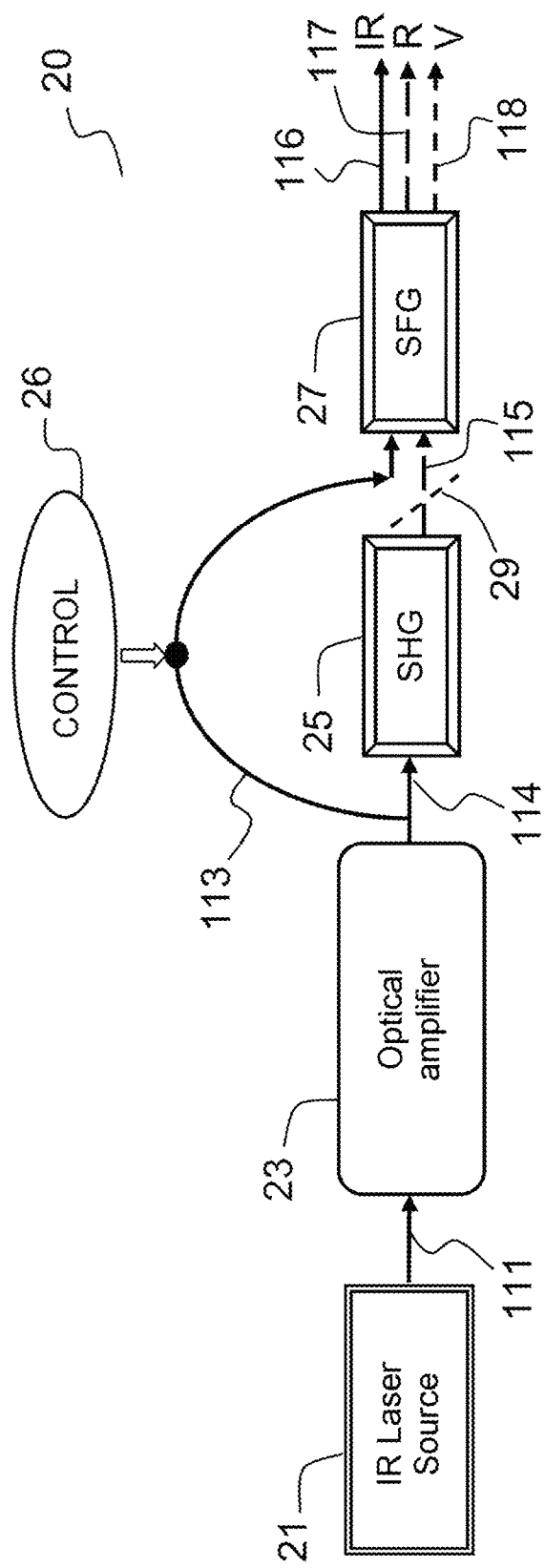
FIG. 5, a schematic illustrating a generator of "trident" type suitable for emitting a plurality of light emissions that are coherent with one another, in the visible and/or infrared.

In the cases where it is sought to generate three light emissions of frequencies that are multiples of the same reference frequency, but different, a generator of "trident" type such as shown in FIG. 5 and described in published patent FR3004820B will possibly be used. Specifically, this generator allows three coherent in-phase light emissions, for example in the visible and/or infrared, to be generated.

More precisely, the generator 20 of coherent laser beams illustrated in FIG. 5 comprises a continuous-wave laser source 21, for example an infrared source, an optical amplifier 23, an SHG (for second harmonic generation) crystal 25 and an SFG (for sum-frequency generation) crystal 27. The optical amplifier, for example an erbium-doped fiber amplifier, allows the required optical power to be delivered when the emission power of the laser source is insufficient. The amplifier may also be integrated into the source. It is also possible to not use an optical amplifier if the emission optical power of the source is sufficient. The laser beam 111 emitted by the infrared laser source 11 and amplified by means of the optical amplifier 23 is split into two beams 113 and 114, the ratio of the optical powers on each of the channels being optimizable depending on the powers required downstream in the generator. The first beam 114 is directly coupled to the first nonlinear crystal 25 in order to generate a laser beam 115 that is the 2nd harmonic in the red of the first beam 114, of 772 nm wavelength for example. The IR second beam 113, which does not pass through the first nonlinear crystal 25, is superposed on the beam 115 generated beforehand in the red, the two beams 113 and 115 being coupled to the second nonlinear crystal 27 in order to sum the red and infrared (IR) frequencies, this resulting in a beam 118 of visible wavelength, of 515 nm for example. The other beams 116 and 117 output from the second nonlinear crystal 27 are residual beams in the infrared and in the red, respectively. Advantageously, a control module 26 allows coupling parameters of the IR second beam 113 to be controlled with a view to coupling to the second nonlinear crystal 27, these parameters possibly being geometry-, polarization- and/or power-related parameters. The temperature of the nonlinear crystals may also be servocontrolled in order to ensure the operation of these crystals is optimized. The control module may in particular comprise means for controlling the optical power of the IR beam at the input of the SFG nonlinear crystal 27, said means being servocontrolled to the optical power output in the green (beam 118). The generator thus described allows three optical emissions that are coherent and in-phase (because generated from the same infrared laser beam) to be emitted, in the green band of the visible spectrum but also in the IR and red bands. The generator 20 may operate in a mode in which the propagation of the beams is over free space or through fibers.

Thus, in the example of FIG. 2 for example, when two generators of "trident" type are used, the following choices will possibly be made:

For the first light emission (i) output from the first generator, $w_1=2w_a$;

For the second light emission (ii) output from the first generator, $w_2=3w_a$;

For the third light emission (vi) output from the first generator, $w_6=w_a$;

For the first light emission (iii) output from the second generator, $W_3=2w_b$;

For the second light emission (ii) output from the second generator, $w_4=3w_b$;

For the third light emission (vi) output from the second generator, $w_7=w_b$;

where $w_b$ and $w_a$ are the different reference frequencies of the first and second generators, respectively.

Thus, if $w_b$ and $w_a$ are infrared frequencies for example, a frequency stabilization of the generators to light emissions in the green, and the generation of the THz emission (v) by means of emissions in the red, results.

Although described by way of a certain number of detailed example embodiments, the method and THz laser source according to the present description comprise various variants, modifications and improvements that will appear obvious to those skilled in the art, it being understood that these various variants, modifications and improvements fall within the scope of the subject matter of the present description, such as defined by the following claims.

The invention claimed is:

1. A THz laser source comprising:
  a first generator suitable for emitting at least one first light emission of frequency $w_1=n\ w_a$ and one second light emission of frequency $w_2=m\ w_a$, where n and m are integers higher than or equal to 1 and where $w_a$ is a first reference frequency;
  a second generator suitable for emitting at least one first light emission of frequency $w_3=l\ w_b$ and one second light emission of frequency $w_4=p\ w_b$, where l and p are integers higher than or equal to 1 and where $w_b$ is a second reference frequency different from the first reference frequency $w_a$; and
  a nonlinear crystal suitable for forming, from said first light emissions emitted by each of the first and second generators, a THz light emission generated by difference-frequency generation, of frequency equal to $w_5=n\ w_a- l\ w_b$ and comprised between 0.3 THz and 10 THz;
  at least one first frequency-stabilizing module allowing the frequency of one of said second emissions emitted by one of the first and second generators to be stabilized to an atomic transition.

2. The THz laser source as claimed in claim 1, comprising first and second frequency-stabilizing modules each allowing the frequency of the second light emission emitted by each of the first and second generators, respectively, to be stabilized to an atomic transition.

3. The THz laser source as claimed in claim 2, wherein the first generator is suitable for emitting at least one third light emission of frequency $w_6=q\ w_a$, where q is an integer higher than or equal to 1;

the second generator is suitable for emitting at least one third light emission of frequency $w_7=r\ w_b$, where r is an integer higher than or equal to 1, with $q\ w_a - r\ w_b$ a multiple or submultiple of $n\ w_a - 1\ w_b$.

4. The THz laser source as claimed in claim 3, furthermore comprising a frequency comparator suitable for receiving the third emissions emitted by each of the first and second generators and a reference signal of given frequency, in order to deliver a radiofrequency resultant signal the frequency of which allows the frequency difference between said third emissions to be determined.

5. The THz laser source as claimed in claim 2, wherein the frequency of at least one of the first and second generators is tunable in a frequency range broader than the line width of the optical transition, allowing a tunable THz source to be formed.

6. The THz laser source as claimed in claim 1, comprising:
a first frequency-stabilizing module allowing the frequency of said second emission emitted by a first of said generators to be stabilized to an atomic transition; and
a module for servocontrolling the second generator to the first generator.

7. The THz laser source as claimed in claim 6, wherein:
said first generator is suitable for emitting at least one third light emission of frequency $w_6=q\ w_a$, where q is an integer higher than or equal to 1;
the servocontrolling module comprises:
a first frequency comparator suitable for receiving the third emission emitted by the first generator and the second emission emitted by the second generator and a first reference signal of given frequency, in order to deliver a first radiofrequency signal; and
a second frequency comparator suitable for receiving said first radiofrequency signal and a radiofrequency second reference signal of given frequency, in order to deliver a control signal characteristic of the frequency difference between the frequencies of the first radiofrequency signal and of the radiofrequency second reference signal;
a second module for controlling the second generator depending on said control signal.

8. The THz laser source as claimed in claim 7, wherein the second generator is tunable and the frequency of the radiofrequency second reference signal is variable in order to form a tunable THz source.

9. The THz laser source as claimed in claim 1, wherein at least one of the first and second generators is a generator of trident type suitable for generating at least three light emissions of different frequencies in the visible and/or infrared, the at least three light emissions having a fixed phase relationship with one another.

10. The THz laser source as claimed in claim 1, wherein said atomic transition is an atomic transition of iodine.

11. A method for emitting a THz light emission comprising the following steps:
generating with a first generator a first light emission of frequency $w_1=n\ w_a$ and a second light emission of frequency $w_2=m\ w_a$, where n and m are integers higher than or equal to 1 and where $w_a$ is a first reference frequency;
generating with a second generator a first light emission of frequency $w_3=1\ w_b$ and a second light emission of frequency $w_4=p\ w_b$, where p is an integer higher than or equal to 1 and where $w_b$ is a second reference frequency different from $w_a$;
forming from said first emissions emitted by the first and second generators a THz light emission generated by difference-frequency generation, of frequency equal to $w_5=n\ w_a - 1\ w_b$ and comprised between 0.3 THz and 10 THz;
stabilizing the frequency of at least one of the second light emissions emitted by the first and second generators.

12. The method for emitting a THz light emission as claimed in claim 11, furthermore comprising the following steps:
generating with the first generator at least one third light emission of frequency $w_6=q\ w_a$, where q is an integer higher than or equal to 1;
generating with the second generator at least one third light emission of frequency $w_7=r\ w_b$, where r is an integer higher than or equal to 1, with $q\ w_a - r\ w_b$ a multiple or submultiple of $n\ w_a - k\ w_b$;
measuring $q\ w_a - r\ w_b$ in order to deduce therefrom the frequency of the THz emission generated.

13. The method for emitting a THz light emission as claimed in claim 11, furthermore comprising the following steps:
varying at least one of the first and second reference frequencies ($w_a$ and/or $w_b$);
stabilizing at least one of the first light emissions emitted by the first and second generators to at least one atomic transition.

14. The method for emitting a THz light emission as claimed in claim 11, comprising the following steps:
stabilizing the frequency of said second emission emitted by a first of said generators to an atomic transition; and
servocontrolling the second generator to the first generator.

* * * * *

UNITED STATES PATENT AND TRADEMARK OFFICE
CERTIFICATE OF CORRECTION

Page 1 of 1

PATENT NO.         : 10,732,484 B2
APPLICATION NO.    : 16/472162
DATED              : August 4, 2020
INVENTOR(S)        : Mohand Ouali Acef It is certified that error appears in the above-identified patent and that said Letters Patent is hereby corrected as shown below:

In the Claims

In Claim 12, Column 12, Lines 35-36, "a multiple or submultiple of n $w_a$ - k $w_b$;" should be -- a multiple or submultiple of n $w_a$ - $\ell$ $w_b$; --.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*